United States Patent [19]
Zollinger

[11] Patent Number: 5,098,344
[45] Date of Patent: Mar. 24, 1992

[54] CONVOLUTED BOOT SEAL WITH LOW FRICTION AND HIGH WALL STRENGTH

[75] Inventor: Donovan J. Zollinger, Saginaw, Mich.

[73] Assignee: General Motors Corporation, Detroit, Mich.

[21] Appl. No.: 447,335

[22] Filed: Dec. 7, 1989

[51] Int. Cl.⁵ .................................................. F16D 3/84
[52] U.S. Cl. ............................... 464/175; 277/212 FB
[58] Field of Search .................. 464/175, 173, 111; 277/212 FB

[56] References Cited

U.S. PATENT DOCUMENTS

| | | | |
|---|---|---|---|
| 1,902,323 | 3/1933 | De Monge | 277/212 FB |
| 3,279,832 | 10/1966 | Bergman | 277/212 FB |
| 3,451,700 | 6/1969 | Smith | 277/212 FB |
| 3,842,621 | 10/1974 | Mazziotti | 464/175 X |
| 4,456,269 | 6/1984 | Krude et al. | 277/212 FB |
| 4,702,483 | 10/1987 | Ukai et al. | 464/175 X |
| 4,957,469 | 9/1990 | Zollinger | 464/175 |

FOREIGN PATENT DOCUMENTS

| | | | |
|---|---|---|---|
| 0319381 | 6/1989 | European Pat. Off. | |
| 2925835 | 6/1979 | Fed. Rep. of Germany | 464/175 |
| 2945234 | 11/1979 | Fed. Rep. of Germany | 464/175 |

Primary Examiner—Daniel P. Stodola
Assistant Examiner—Tony A. Gayoso
Attorney, Agent, or Firm—F. J. Fodale

[57] ABSTRACT

Multiconvoluted boot seal for universal joints and other mechanisms in which convolution side walls have radial ribs formed therein to strengthen the walls to reduce wrinkling and resultant cracking at high joint angles. The ribs on one side wall are external at high joint angles and mesh with rib spaces formed by internal ribs on an adjacent side wall. This meshing reduces relative turning movement between the side walls so that abrasion and boot seal wear is reduced.

6 Claims, 2 Drawing Sheets

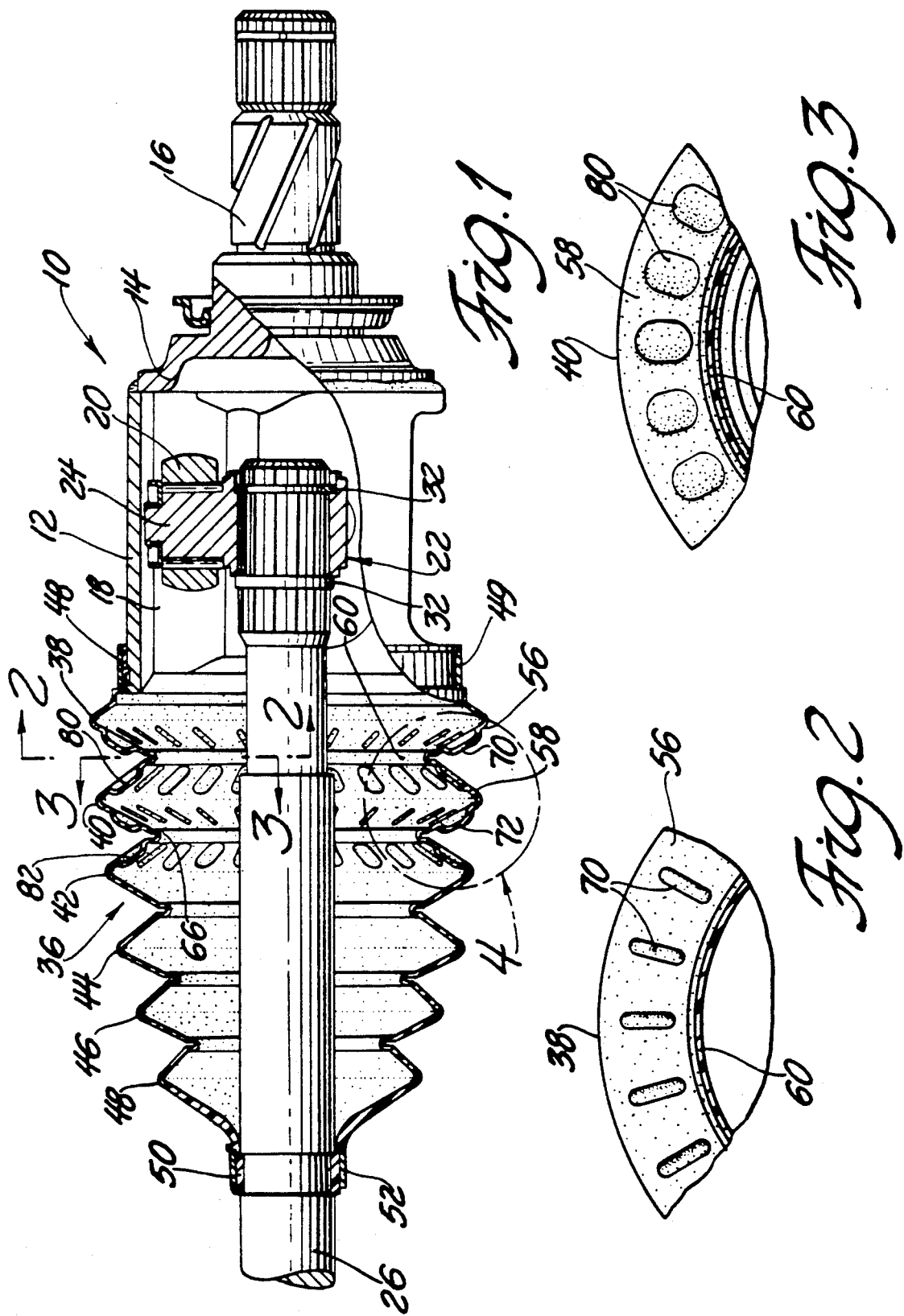

CONVOLUTED BOOT SEAL WITH LOW FRICTION AND HIGH WALL STRENGTH

TECHNICAL FIELD

This invention relates to boot seals for universal joints and other movable mechanisms and more particularly to a new and improved convoluted boot seal operative over a wide temperature and flexure range featuring strengthening rib construction in convolution side walls to minimize convolution root joint stress and wall abrasion and wear while increasing wall strength.

BACKGROUND OF THE INVENTION

Prior to the present invention, convoluted boot seals of rubber and plastic materials for universal joints and other mechanisms have been designed with various constructions to control and enhance the action of the boot seal during the various geometric motions of the seal protected device. The boot seal disclosed in U.S. Pat. No. 4,456,269 issued to Werner Krude et al June 26, 1984, for example, is provided with web like external ribs interconnecting an end attachment collar to an adjacent convolution to reinforce and strengthen the boot seal. The disclosed boot seal further has radially inward projections which act as stop means when the joint is articulated toward its limits. In U.S. Pat. No. 4,702,483 issued to Mikio Ukai et al Oct. 27, 1987, a circumferential convex strip is provided on an inner surface of at least one of the convolutions of the boot seal to control the manner in which the seal collapses under certain operations to prevent the entrapment of convolutions between a first convolution and a drive shaft.

The present invention is of the general category of U.S. Pat. Nos. 4,456,269 and 4,702,483 cited above, but provides new and improved convoluted boot seal preferably of a suitable resilient plastic material with wall construction designed to increase wall strength to reduce wrinkling and to reduce wall to wall scrubbing for minimized abrasion and convolute root stress during the flexure action of the boot including the high angled stroking and rotational drive of an axle shaft with respect to a universal joint housing.

In the preferred embodiment of the invention the boot seal is blow molded from a thermoplastic material and the walls of at least some adjacent convolutions respectively have aligned and cooperative internal and external ribs formed directly therein. During action of the device protected by the seal, the cooperative ribs can mesh to limit sliding contact of adjacent convolution side walls to limit and transfer torsional load and reduce abrasion and wear of such walls as well as convolution root joint stress and thereby increase boot service life. These ribs also strengthen the walls of the convolution so that they will not wrinkle and crack under working conditions particularly at low temperatures which may range to −40° F.

More particularly, the arcuately spaced external ribs are directly formed in the surface of one sidewall in an annular pattern and generally project toward the sidewall of an adjacent convolution. The sidewall of the adjacent convolution is formed with internal ribs directly therein providing corresponding recesses or spaces into which the external ribs of the first sidewall fit during certain boot seal flexure actions. This rib and the rib space engagement is similar to that of spur gear teeth. However, in the present invention, the rib space or lash provided by the side walls of the internal ribs can be varied to control the relative rotational movement between the sidewalls of the convolutions.

With a wide rib space, limited turning of one convolution side wall relative to the side wall of the adjacent convolution is provided so that torsional boot flexure loads can be distributed throughout the entire boot seal. The spacing for the ribs can also be such that there is substantially no relative rotary movement between the rib and the meshing rib space so that there is substantially no relative turning motion between adjacent large diameter convolutions so that torsional flexure loads are transmitted to different areas of the boot. Accordingly, with a "no lash" configuration, the relative turning of the convolution could be limited to the outboard small diameter convolutions which generally do not contact each other so that frictional wear of interfacing side walls throughout the boot seal is substantially eliminated.

These and other features, objects and advantages of the present invention will become more apparent from the following detailed description and drawing in which:

FIG. 1 is an elevational view partially sectioned of a universal joint of a drive axle assemble with the boot of this invention shown in section.

FIG. 2 is a sectional view taken along lines 2—2 of FIG. 1.

FIG. 3 is a sectional view partially broken away and taken substantially along lines 3—3 of FIG. 1.

DETAILED DESCRIPTION OF THE DRAWINGS

Figure 4:
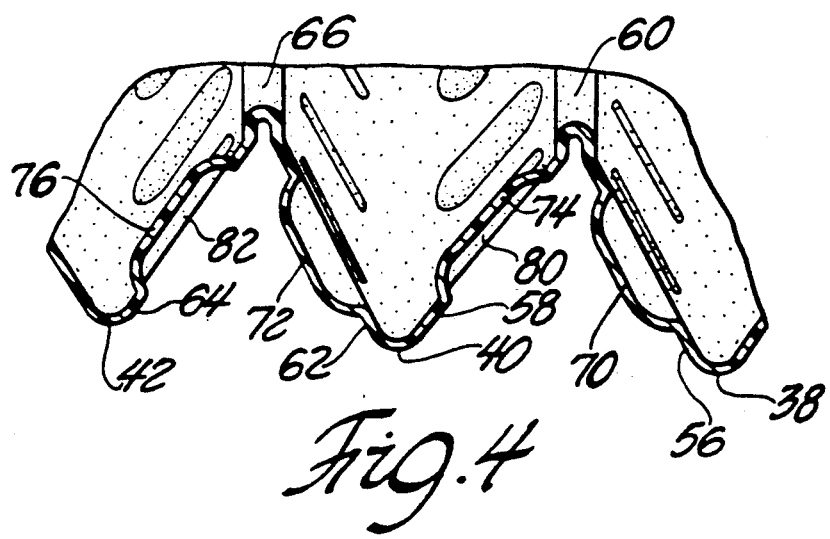
FIG. 4 is a view of the area of the boot of FIG. 1 encircled and identified by numeral 4.

Referring now in greater detail to the drawing, FIG. 1 shows a portion of a vehicle drive axle including a stroking universal joint 10 of the tripot type having a three lobe drive housing 12. The drive housing is closed at its inboard end by an end wall 14 and has a centralized drive shaft 16 integral therewith which extends axially therefrom to a terminal splined end adapted to be connected to the side gear of a differential providing the output of an automatic or manual transmission, not shown.

The drive housing is open at its outer end and has three equally spaced and longitudinally extending drive channels 18, only one of which is illustrated, formed by the internal walls of the lobes. These channels have partial spherical tracks that engage the outer surface of associated drive rollers 20 of a spider assembly 22. Each drive roller is mounted on an associated one of three arcuately spaced trunnions 24 extending radially from a centralized hub of the spider assembly. The rollers are mounted on the trunnions with a full complement of needle bearings interposed between the roller and the associated trunnion. These drive rollers are thus rotatable on the trunnions and are slidable with respect to housing 12 to allow the sliding pivotal movement of an elongated axle shaft 26 drivingly connected to the spider assembly.

The hub of the spider assembly has internal splines for drive connection with the externally splined inboard end portion of the axle shaft that extends through the open end of the drive housing. The spider hub is trapped in the FIG. 1 position of drive shaft between snap rings 32 which fit into an annular groove formed in the splines of the inboard end portion of shaft.

The outboard end of universal joint 10 is sealed by a bellows-type boot seal 36 preferably blow molded from a thermoplastic material which has high strength and toughness throughout a wide range of temperatures and other environmental conditions such as would be experienced by automotive vehicles in worldwide use.

The boot seal has a series of convolutions 38, 40, 42, 44, 46 and 48 whose diameters are stepped with the largest diameter convolution 38 having a cylindrical collar 48 that fits around the outer periphery of the outboard end of housing 12 and is secured thereto by clamp 49. The smallest diameter convolution has a neck portion 50 that fits over the axle shaft 26 and is secured thereto in a fluid-type manner by constricted clamp 52 so that the interior of the housing is sealed and environmentally protected by the boot seal.

The convoluted boot seal 36 is a continuous bellows and the convolutions have angularly facing sidewalls which extend radially inward into connection at annular roots which form live hinges that allow boot seal flexure and bending during stroking and angular movements of the shaft 26 relative to housing 12.

For example, the first and largest diameter convolution 38 has an inclined outboard sidewall 56 which faces adjacent sidewall 58 of second convolution 40 which are joined at the annular root or live hinge 60. The second convolution 40 (FIG. 4) has a slightly reduced diameter as compared to the first convolution and has an outboard sidewall 62 which faces an inboard sidewall 64 of third diameter convolution 42. These sidewalls are joined at an annular live hinge or root 66. As shown, this construction continues throughout the whole extent of the boot seal down to the inner facing sidewalls of the smallest diameter convolutions 46 and 48.

Figure 5:
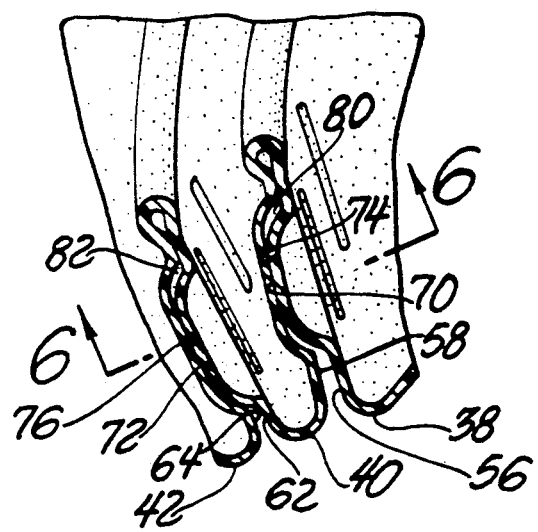
FIG. 5 is a view illustrating the interconnection of the ribs into the rib spaces of the boot of FIG. 1 as the drive axle angulates with respect to the housing.
Figure 6:
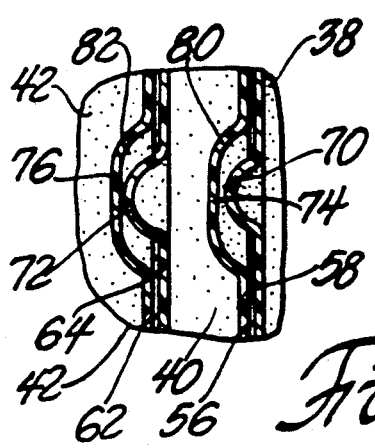
FIG. 6 is a view in cross section taken generally along lines 6—6 of FIG. 5.

To reduce root joint stress and frictional wear between the sidewalls of the boot seal so that the boot seal has a long service life, the preferred embodiment of this invention has arcuately spaced external ribs 70, 72, respectively, on the outboard side walls 56, 62 of convolutions 38 and 40 and arcuately spaced internally extending ribs 74, 76 respectively on the inboard side walls of convolutions 40 and 42. The internally extending ribs 74, 76 provide rib spaces 80, 82 for the external ribs. The rib and rib space orientation are such that the external ribs 70, 72, respectively, mesh into the rib spaces 80, 82 of the adjacent side face at various flexure positions of the boot seal in accommodating the angular movement of the axle shaft 26 relative to the housing. Without the present invention and at high joint angles, the sidewalls of the large diameter convolutions could experience substantial relative rotation and frictional rubbing contact with one another whereas the sidewalls of the smaller diameter convolutions generally do not wear. For example, in the universal joint of FIG. 1, the axle shaft 34 can, within limits, be moved from the horizontal position shown to an indefinite number of stroked and pivoted positions. FIGS. 5 and 6 show one fluid position of the boot seal when the axle shaft has been swung from the FIG. 1 position to an angular position with respect to housing 12 so that sectors of the large diameter convolutions 38, 40, 42 are moved toward sidewall contact. However, the ribs 70 and 72 of the outboard facing sidewalls 56 and 62 engage into the rib spaces 80 and 82 formed in the inboard side walls 58 and 64 of the convolutions 40 and 42. With this construction, as convolutions 38, 40, 42 try to turn relative to one another, the meshing rib and rib spaces limit this motion so that the frictional wear of the side walls of these convolutions are reduced.

In FIG. 6 it will be seen that the rib spaces 80, 82 have a width larger than the width of ribs 70, 72 of the sidewalls adjacent thereto so that there may be some relative motion between these sidewalls. However, the motion is limited and wear is reduced. This relative motion terminates as the end walls of the rib spaces are contacted by the associated ribs and the torsion loads are transmitted to convolutions which normally do not experience side wall engagement. Under such conditions, side wall frictional wear is minimized in the larger convolution while torsional root joint loads are distributed throughout the boot seal.

The internal and external ribs extend radially and strengthen the walls of the thin walled plastic boot seal which may otherwise wrinkle and crack particularly at high joint angle operation and severely cold temperatures.

Figure 7:
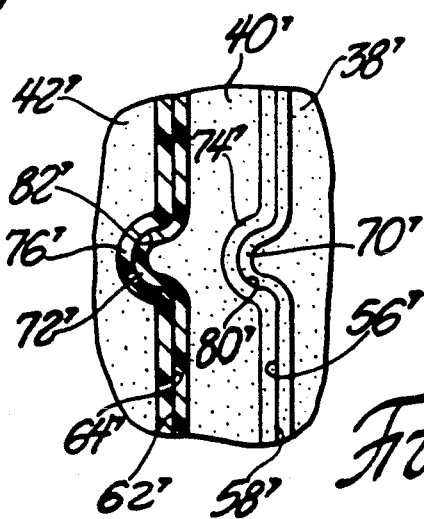
FIG. 7 is a view similar to that of FIG. 6 but showing the ribs and the rib spaces to closely mesh to illustrate a second embodiment of the invention.

FIG. 7 illustrates another preferred embodiment of the invention where ribs 70', 72' of sidewalls 56', 62' of convolutions 38', 40' and 42' fit into the rib spaces 80', 82' of side walls 58', 64', with any lash. With this construction, relative turning motion of the large diameter convolution is eliminated so that the side walls thereof cannot abrade against one another and wear. The torsional loads are again transferred to the smaller diameter convolutions, but those convolutions generally do not have any side face contact so that there is no wear in these areas. Furthermore, the large torsional loads normally carried by the root joints of the larger convolution is distributed along the boot seal to the root joints of the smaller convolutions.

With this invention there is increased strength of some or all of the walls of the convolution of the half-shaft boot seal without adding extra material since the ribs and rib spaces are formed directly into the walls of the boot. Furthermore, there is no wrinkling of the side walls of the boot seal convolution at high joint angles and cold environments which could result in creases and cracks to reduce the integrity of the boot seal.

While specific and preferred embodiments of the invention have been shown and described in detail to illustrate application of the inventive principles, it will be understood that the invention may be modified otherwise without departing from such principles.

The embodiments of the invention in which an exclusive property or privilege is claimed are defined as follows:

1. A boot seal for a mechanism that has a housing section and a shaft section interconnected by a pivot so that said sections are movable through a wide range of pivot angles with respect to one another while rotating together, said boot seal having a first end adapted to be fastened to the housing and a second end adapted to be fastened to the shaft section, the improvement comprising:

a plurality of convolutions in said boot seal between said first and second ends a pair of said convolutions having sidewalls which face one another, one of said sidewalls having a plurality of externally extending ribs formed therein and the other of said sidewalls having a plurality of internally extending ribs formed therein, said internally extending ribs forming recesses for meshing with the externally extending ribs when the shaft section is at a predetermined angle with respect to the housing section to limit the relative turning movement of said sidewalls with respect to one another and the frictional wear therebetween.

2. The boot seal defined in claim 1 wherein said recesses have widths greater than the widths of corresponding external ribs in the other of said convolution sidewalls so that said relative rotary movement between said sidewalls is limited after predetermined relative rotary movement.

3. The boot of claim 1 wherein said recesses have width substantially the same as the widths of corresponding external ribs so that there is substantially no relative motion between said sidewalls subsequent to the meshing of said ribs with said recesses.

4. A boot seal of a resilient plastics material for sealing a rotatable housing of a universal joint to a shaft rotatable with said housing and extending from a universal pivot joint connection within the interior of said housing comprising:

a thin walled boot seal body having a plurality of annular convolutions therein extending from a first and large diameter convolution for seal connection to said housing of the universal joint to a final and small diameter convolution for sealing connection with the shaft, a pair of said convolutions having inclined and facing sidewalls which extend in a generally radial and inward direction into connection at an annular root therebetween, one of said side walls having arcuately spaced, external ribs formed therein, the adjacent one of said sidewalls having arcuately spaced internal ribs therein forming rib spaces in general axial alignment with said external ribs for meshing with said external ribs, said ribs being spaced from said rib spaces in a first range of angles of said shaft with respect to said housing and meshing with said rib spaces in a range of angles greater than said first range, said meshing rib and rib spaces cooperating with one another during said second range to reduce the relative rotation and friction between the adjacent sidewalls to thereby limit frictional wear of said side walls and resultantly increase the service life of said boot seal.

5. The boot of claim 4 wherein said rib spaces have a width greater than the width of the ribs to allow limited rotational movement of one of said sidewalls relative to the other so that the torsional deflection is distributed into the roots of other convolutions of said boot seal.

6. The boot of claim 4 wherein said rib spaces have a width that closely corresponds to width of the ribs to meshingly receive the ribs therein for reducing the relative rotary movement between said sidewalls to a minimum relative rotary movement.

* * * * *